United States Patent Office.

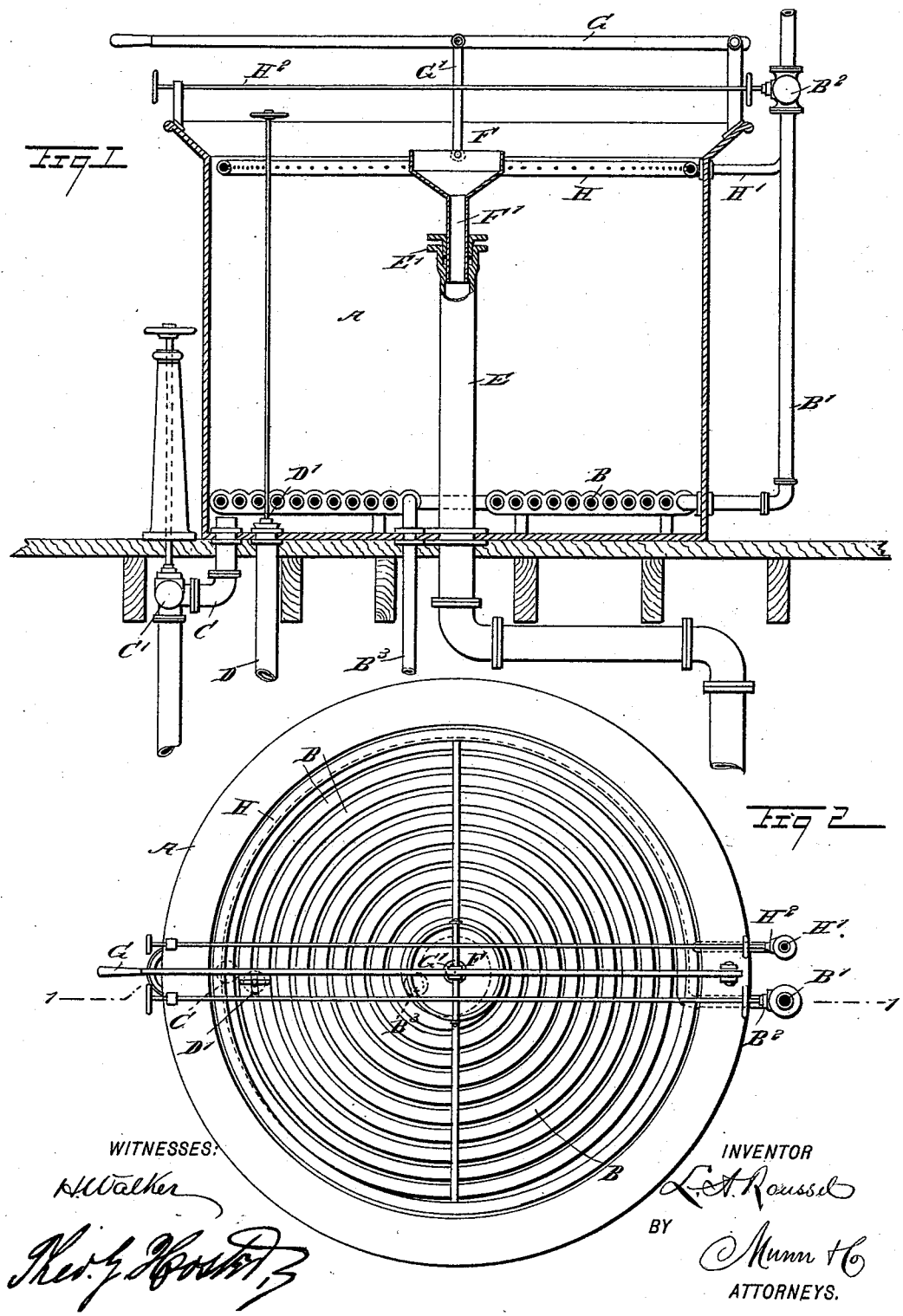

LOUIS AMÉDÉE ROUSSEL, OF PATTERSON, LOUISIANA.

DEFECATOR.

SPECIFICATION forming part of Letters Patent No. 541,686, dated June 25, 1895.

Application filed January 29, 1895. Serial No. 536,594. (No model.)

*To all whom it may concern:*

Be it known that I, LOUIS AMÉDÉE ROUSSEL, of Patterson, in the parish of St. Mary's and State of Louisiana, have invented a new and Improved Defecator, of which the following is a full, clear, and exact description.

The invention relates to defecators for cleaning cane juice, saccharine or other liquors; and its object is to provide a new and improved defecator which is comparatively simple and durable in construction, very effective in operation, and arranged to effect a perfect defecation or removal of the scum without any manual labor whatever.

The invention consists of certain parts and details and combinations of the same, as will be fully described hereinafter and then pointed out in the claims.

Reference is to be had to the accompanying drawings, forming a part of this specification, in which similar letters of reference indicate corresponding parts in both the figures.

Figure 1 is a sectional side elevation of the improvement on the line 1 1 of Fig. 2; and Fig. 2 is a plan view of the same.

The pan or vessel A is adapted to be charged with cane juice, saccharine or other liquor to be treated, and in the bottom of the said pan or vessel is arranged a coil of pipe B, connected at its outer end with a steam pipe B' leading to a boiler or other steam supply and provided with a valve B², under the control of the operator, to admit or shut off the steam to or from the coil of pipe B. The inner end of the latter near the center of the vessel A is provided with a pipe B³, extending through the bottom of the pan or vessel, to a suitable place of discharge, the said pipe serving to carry off the water of condensation.

In the bottom of the vessel or pan A, extends the juice discharge or exit pipe C, provided with a valve C', and serving to carry off the clean juice after the scum is removed. A wash pipe D, provided with a valve D', serves to wash the pan or vessel whenever deemed necessary.

In the center of the pan or vessel A is arranged a stand pipe E, extending through the bottom of the pan or vessel, to a suitable place of discharge, the said pipe serving to carry off the scum in the manner hereinafter more fully described.

The upper end of the stand pipe E is provided with a stuffing box E', in which is fitted to slide a tube F' forming the discharge nozzle of a funnel F, hung on a link G' pivotally connected with a lever G over the pan or vessel A, and under the control of the operator, to permit the latter to raise or lower the funnel F according to the level of the liquid in the pan or vessel A. In the upper part of the latter is arranged a perforated pipe H, conforming to the shape of the vessel, and arranged close to the inner side thereof, as is plainly shown in the drawings, the said pipe being connected by a supply pipe H', with a steam or air supply, so that steam or compressed air forced through the perforations in the pipe, passes to the level of the liquid to blow the scum toward the center of the pan or vessel A and into the funnel F, extending with its upper edge to or slightly below the level of the liquid.

The operation is as follows: When the vessel A is filled with liquid up to within a short distance of the pipe H, and heat is applied by passing steam to the coil of pipe B, then the heat diminishes from the wall of the vessel toward the center, and causes the scum to rise to the level of the liquid, and to float toward the center thereof, into the funnel F, lowered sufficiently to receive the scum. By passing steam, compressed air or other fluid through the perforations in the pipe H, the floating scum is forced toward the center and into the funnel F, thus aiding in removing the scum as the latter rises by the heat applied in the bottom of the vessel. It is understood that by the operator manipulating the lever G, the funnel F is raised and lowered in the stand pipe E, to bring the upper edge of the funnel in proper position to receive the centrally floating scum.

Having thus fully described my invention, I claim as new and desire to secure by Letters Patent—

1. A defecator, comprising a scum-delivery stand pipe arranged centrally in a vessel or pan, means for heating the juice at the bottom of the pan and means for forcing the floating scum from the sides toward the center of the vessel and into the top of the stand pipe, substantially as shown and described.

2. A defecator provided with a scum-delivery stand pipe arranged centrally in a vessel or pan, means for heating the liquid in the bottom of the pan or vessel, and a funnel held vertically adjustable with its nozzle in the said stand pipe, substantially as shown and described.

3. A defecator, comprising a scum-delivery stand-pipe arranged vertically in a pan or vessel, a funnel held adjustable on the upper end of the said stand-pipe, a coil of pipe in the base of the pan or vessel, and means for heating the juice in the bottom of the pan or vessel with gradually diminishing heat from the outside of the vessel toward the center, to cause the scum to rise to the surface and float to the said funnel, substantially as shown and described.

4. A defecator, comprising a scum-delivery stand-pipe arranged vertically in a pan or vessel, a funnel held adjustable on the upper end of the said stand-pipe, a coil of pipe in the base of the pan or vessel, means for heating the juice in the bottom of the pan or vessel with gradually diminishing heat from the outside of the vessel toward the center, to cause the scum to rise to the surface and float to the said funnel, and a perforated pipe in the upper end of the said pan or vessel, and connected with a suitable source of fluid discharged through the perforations to the level of the liquid in the pan, to force the scum to the said funnel, substantially as shown and described.

LOUIS AMÉDÉE ROUSSEL.

Witnesses:
BERNARD LEVY,
LEON F. HAUBTMAN.